United States Patent
Kennedy

(10) Patent No.: US 11,351,841 B2
(45) Date of Patent: Jun. 7, 2022

(54) CONTROL SYSTEM AND METHOD FOR AN ELECTRONICALLY GOVERNED ENGINE OF A REFRIGERATION SYSTEM

(71) Applicant: THERMO KING CORPORATION, Minneapolis, MN (US)

(72) Inventor: Pierce D. Kennedy, Rahoon (IE)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 16/933,176

(22) Filed: Jul. 20, 2020

(65) Prior Publication Data

US 2021/0031593 A1  Feb. 4, 2021

(30) Foreign Application Priority Data

Jul. 29, 2019  (EP) ..................... 19188955

(51) Int. Cl.
B60H 1/32 (2006.01)

(52) U.S. Cl.
CPC ......... B60H 1/3208 (2013.01); B60H 1/3232 (2013.01); B60H 2001/3266 (2013.01); B60H 2001/3273 (2013.01)

(58) Field of Classification Search
CPC .... B60H 2001/3273; B60H 2001/3266; B60H 1/3232; B60H 1/3208; F05D 2270/02; F05D 2270/03; F02D 31/001; F02D 2200/50
See application file for complete search history.

(56) References Cited

U.S. PATENT DOCUMENTS

| | | | |
|---|---|---|---|
| 5,172,560 A | 12/1992 | Jurewicz et al. | |
| 6,487,869 B1 | 12/2002 | Sulc et al. | |
| 2002/0174666 A1* | 11/2002 | Viegas | F25D 29/001 62/131 |
| 2009/0314019 A1 | 12/2009 | Fujimoto et al. | |
| 2010/0115902 A1* | 5/2010 | Schlesser | A01F 15/04 56/10.2 R |
| 2013/0289762 A1* | 10/2013 | Olaleye | H04L 67/12 700/228 |
| 2014/0144164 A1* | 5/2014 | Steele | B60H 1/3222 62/115 |
| 2015/0000636 A1 | 1/2015 | Stockbridge et al. | |
| 2017/0151859 A1 | 6/2017 | Dykes et al. | |
| 2017/0284326 A1* | 10/2017 | Hori | F02D 31/001 |
| 2019/0061473 A1 | 2/2019 | Dykes et al. | |

OTHER PUBLICATIONS

Extended European Search Report, issued in the corresponding European patent application No. 19188955.9, dated Jan. 31, 2020, 9 pages.

* cited by examiner

Primary Examiner — Schyler S Sanks
(74) Attorney, Agent, or Firm — Hamre, Schumann, Mueller & Larson, P.C.

(57) ABSTRACT

There is disclosed a transport refrigeration system comprising an electronically governed engine that drives a refrigeration circuit of the system. The engine control unit is configured to operate the engine in a droop mode of operation, in which the engine speed increases with decreasing engine loads from the refrigeration circuit, so as to maximise the cooling capacity of the system at low engine load conditions.

17 Claims, 6 Drawing Sheets

CONTROL SYSTEM AND METHOD FOR AN ELECTRONICALLY GOVERNED ENGINE OF A REFRIGERATION SYSTEM

The technology described herein relates to a refrigeration system that includes an electronically governed engine, and in particular a control system and method for operating the electronically governed engine of the system.

BACKGROUND

A transport refrigeration system (TRS) typically includes a transport refrigeration unit (TRU) which is attached to a transport unit (e.g., a truck, a container (such as a container on a flat car, an intermodal container, etc.), a box car, a semi-tractor, a bus, or other similar transport unit), to control one or more environmental conditions (e.g., temperature, humidity, air quality, etc.) of an interior space of the transport unit. This may be done to maintain perishable cargo (e.g., produce, frozen foods, pharmaceuticals, etc.) stored within the interior space of the transport unit.

A TRU typically includes a refrigeration circuit that includes a compressor, a condenser, an expansion valve, an evaporator, and fans or blowers to control the heat exchange between the air inside the interior space and the ambient air outside of the TRU. An internal combustion engine is normally used to generate power that drives the compressor of the TRU in rotation to force refrigerant through the circuit. In some cases, the compressor is driven by the engine directly, such that the rotational speed of the compressor is directly proportional to that of the engine.

Current emission standards for engines, such as European Non-Road Mobile Machinery (NRMM) Stage V regulation or North American Tier 4 Standards, put limitations on the output of engine power and thus the amount of power a TRU can use from the engine. To meet such emission standards, compressor engines are usually provided with a so-called "governor", i.e. a device which is configured to limit the power of the engine by restricting fuel (and e.g. air) to the engine, for example when the engine prime mover reaches its rated speed at full load (also known as the rated load, i.e. the maximum load that the engine is manufactured to withstand at its rated speed). The rated speed is the engine speed of a fully-loaded engine (typically measured in revolutions per minute, or RPM) at maximum allowed power.

It is known to provide electronic governors that comprise one or more electric solenoid valves for controlling the rate of fuel flow to the engine, and these valves are actuated by appropriate control signalling from an engine control unit (ECU). Electronic governors for TRU engines typically operate in an isochronous mode of operation, wherein the ECU maintains a constant engine speed for varying engine loads. This is done by regulating the position of the fuel valve such that the amount of fuel reaching the combustion chamber will increase or decrease in line with the load. In practice, the ECU may continuously monitor the engine speed via one or more sensors (as is known in the art) and regulate the position of the solenoid valve to compensate for any speed changes as a result of load variations. The monitoring and valve-actuation process is carried out sufficiently quickly to ensure that no appreciable difference in engine speed occurs for varying loads.

The speed of an electronically governed engine is typically capped at the rated speed of the engine to ensure that the engine does not exceed its power limit when at full load. However, this also places a cap on the rotational speed of the compressor and thus the rate at which the compressor can pump refrigerant about the refrigeration circuit and in turn the cooling capacity of the TRU.

Accordingly, it is desired to improve the cooling capacity of TRUs which are driven by power limited engines.

SUMMARY

According to an aspect of the technology described herein, there is provided a transport refrigeration system comprising: an electronically governed engine; a transport refrigeration unit including a refrigeration circuit that is configured to be driven by the engine; and an engine control unit configured to operate the engine in a droop mode of operation, in which the engine speed increases with decreasing engine loads from the refrigeration circuit.

The Applicant has recognised that it is possible to maximise the cooling capacity of a power limited TRU without increasing engine power, and does this by operating an electronically governed engine of the TRU in a so-called "droop mode" of operation, in which the engine speed is allowed to vary with different engine loads. This is in contrast to the conventionally used isochronous mode in which the engine speed is kept constant for varying engine loads (although in embodiments the engine is operable in both of these modes, as will be described later). In particular, the speed of the electronically governed engine may be increased (e.g. beyond its rated speed) without increasing engine power, in circumstances where the engine is not at full load. The increased engine speed would enable a greater mass of refrigerant to be pumped through the refrigeration cycle by a compressor thereof, thereby increasing the cooling capacity of the system.

The engine control unit may be configured to alternately operate the engine in the droop mode of operation and an isochronous mode of operation, in which the engine speed is maintained at a fixed speed for varying engine loads.

The engine control unit, or a controller of the transport refrigeration unit, may be configured to monitor an operating parameter that is indicative of the engine load. The engine control unit may be configured to automatically alternate between the droop mode of operation and the isochronous mode of operation based on the operating parameter.

The engine control unit may be configured to operate the engine in the droop mode of operation, if the monitored operating parameter is at or below a predetermined threshold value for the operating parameter. The engine control unit may be configured to operate the engine in the isochronous mode of operation, if the operating parameter is greater than the predetermined threshold value.

The operating parameter may be a box temperature of the transport refrigeration unit or a load acting on the prime mover of the engine.

The engine control unit may be configured to operate the engine in the droop mode of operation when the transport refrigeration unit requires an engine speed above a rated speed of the engine to meet the cooling demands of the system.

The engine control unit may be configured to operate the engine in the isochronous mode of operation when the transport refrigeration unit operates in a continuous cool modulation mode.

The engine control unit may be configured to operate the engine in the droop mode of operation when the transport refrigeration unit operates in a pull-down mode of operation.

The system may comprise a user-operable switch which causes the engine control unit to operate the engine in the droop mode of operation when the switch is set to a first state, and which causes the engine control unit to operate the engine in the isochronous mode of operation when the switch is set to a second, different state to the first state.

According to another aspect of the technology described herein, there is provided a method of operating a transport refrigeration system, comprising: powering an electronically governed engine to drive a refrigeration circuit in a transport refrigeration unit of the system; and operating the engine in a droop mode of operation, in which the engine speed increases with decreasing engine loads from the refrigeration circuit.

The engine control unit may alternately operate the engine in the droop mode of operation and an isochronous mode of operation, in which the engine speed is maintained at a fixed speed for varying engine loads.

The method may comprise monitoring, using the engine control unit or a controller of the transport refrigeration unit, an operating parameter that is indicative of the engine load. The method may comprise the engine control unit automatically alternating between the droop mode of operation and the isochronous mode of operation based on the operating parameter.

The method may comprise the engine control unit operating the engine in the droop mode of operation, if the monitored operating parameter is at or below a predetermined threshold value for the operating parameter. The method may comprise the engine control unit operating the engine in the isochronous mode of operation, if the operating parameter is greater than the predetermined threshold value.

As mentioned above, the operating parameter may be a box temperature of the transport refrigeration unit or a load acting on the prime mover of the engine.

A user of the system may operate a switch of the system to cause the engine control unit to operate the engine in either the isochronous mode of operation or the droop mode of operation.

The engine control unit may operate the engine in the droop mode of operation when the transport refrigeration unit requires an engine speed above a rated speed of the engine to meet the cooling demands of the system.

The engine control unit may operate the engine in the isochronous mode of operation when the transport refrigeration unit operates in a continuous cool modulation mode.

The engine control unit may operate the engine in the droop mode of operation when the transport refrigeration unit operates in a pull-down mode of operation.

The various "units" described herein, such as the unit controller or the engine control unit, may be coupled to one another via a wireless link and may consequently comprise transceiver circuitry and one or more antennas. Additionally or alternatively, the units described herein may be coupled to one another via a wired link and may consequently comprise interface circuitry (such as a Universal Serial Bus (USB) socket). It should be appreciated that the modules described herein may be coupled to one another via any combination of wired and wireless links.

The various units described herein may comprise any suitable circuitry to cause performance of the methods described herein and as illustrated in the Figures. The modules may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The various units may comprise and/or be in communication with one or more memories, e.g. non-transitory computer readable storage mediums, that store the data described herein, and/or that store software (computer readable instructions) for performing the processes described herein.

BRIEF DESCRIPTION OF THE DRAWINGS

The technology described herein will now be described by way of example with reference to the accompanying drawings, in which.

DETAILED DESCRIPTION

Figure 1:
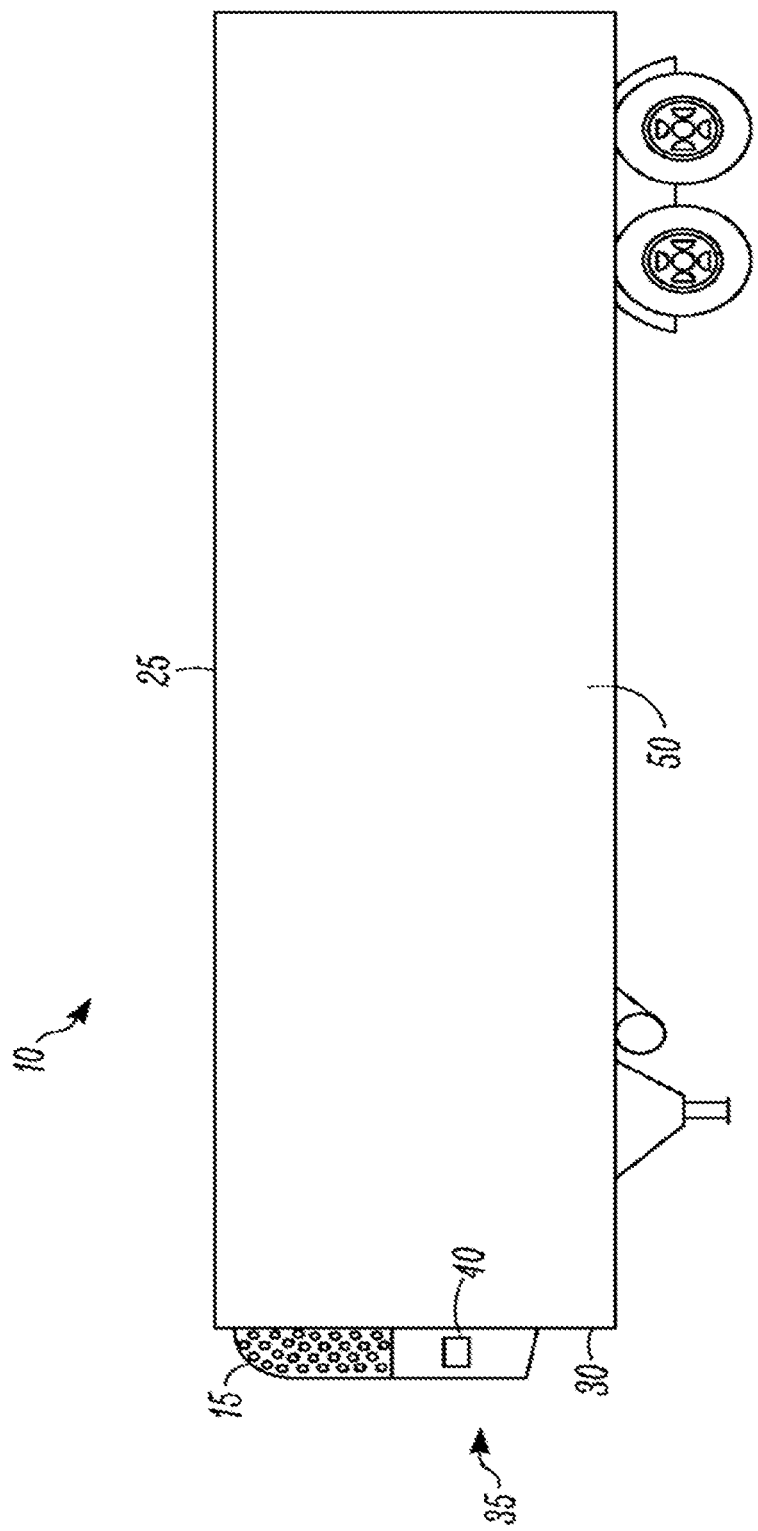
FIG. 1 is a side view of a TRS for a transport unit, according to an embodiment.

FIG. 1 is a side view of a transport refrigeration system (TRS) 10 for a transport unit 25, according to an embodiment. The illustrated transport unit 25 is a trailer-type transport unit. Embodiments as described in this specification can be used with other types of transport units. For example, the transport unit 25 can represent a container (e.g., a container on a flat car, an intermodal container, etc.), a truck, a boxcar, or other similar type of transport unit having an interior space that can be environmentally controlled.

The TRS 10 is configured to control one or more environmental conditions such as, but not limited to, temperature, humidity, and/or air quality of an interior space 50 of the transport unit 25. In an embodiment, the interior space 50 can alternatively be referred to as the conditioned space 50, the cargo space 50, the environmentally controlled space 50, a box 50, or the like. The TRS 10 is configured to transfer heat between the air inside the interior space 50 and the ambient air outside of the transport unit 25.

The interior space 50 can include one or more partitions or internal walls (not shown) for at least partially dividing the interior space 50 into a plurality of zones or compartments, according to an embodiment. It is to be appreciated that the interior space 50 may be divided into any number of zones and in any configuration that is suitable for refrigeration of the different zones. In some examples, each of the zones can have a set point temperature that is the same or different from one another.

Figure 2:
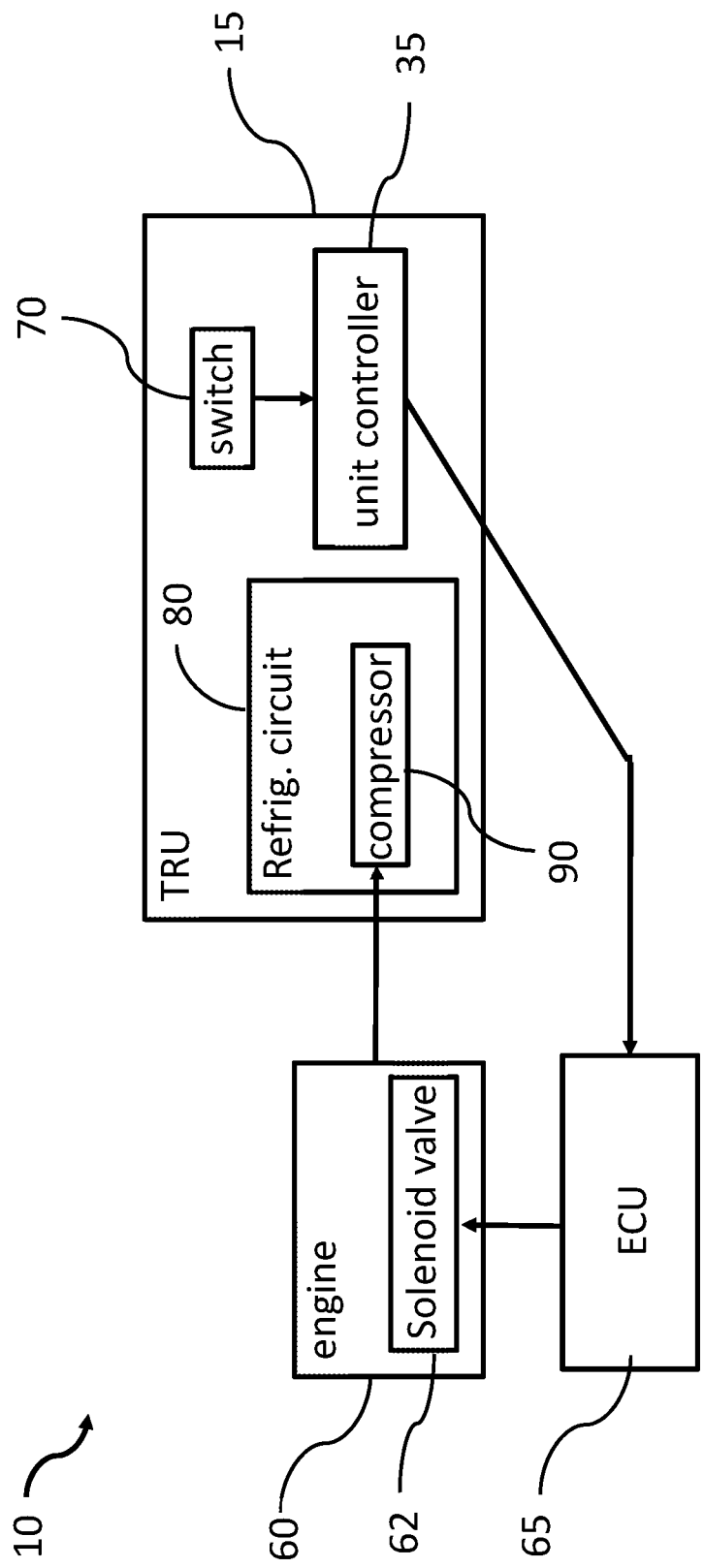
FIG. 2 is a schematic illustration of the TRS of FIG. 1.

With reference to both FIGS. 1 and 2, the TRS 10 includes a transport refrigeration unit (TRU) 15. The TRU 15 is provided on a front wall 30 of the transport unit 25, as shown in FIG. 1.

The TRU 15 includes a programmable unit controller 35 that includes a single integrated control unit 40. It will be appreciated that in other embodiments, the unit controller 35 may include a distributed network of TRS control elements (not shown). The unit controller 35 can include a processor, a memory, a clock, and an input/output (I/O) interface (not shown). The unit controller 35 can include fewer or additional components.

The TRU 15 also includes a closed refrigeration circuit (reference 80 in FIG. 2), which generally defines the flow of refrigerant through the refrigeration system 10. The refrigeration circuit 80 includes a compressor 90, a condenser (not shown), an expansion valve (not shown), and an evaporator (not shown). From the compressor 90, relatively hot vapor refrigerant is delivered to the condenser which is in thermal communication with a cooler ambient environment so that heat is removed from the refrigerant. From the condenser, the cooler liquid refrigerant is delivered (via the expansion valve) to the evaporator which is in thermal communication with a space to be conditioned, e.g. refrigerated. As air circulates over the evaporator, the liquid refrigerant droplets evaporate and absorb heat from the air in order to cool the space. To complete the refrigeration circuit, the vapor refrigerant is delivered from the evaporator back to the compressor.

The unit controller 35 controls the refrigeration circuit of the TRS 10 to obtain a desired state (e.g., temperature, humidity, air quality, etc.) of the interior space 50. In particular, the unit controller 35 may be in wired or wireless communication with one or more sensing devices that are used to measure a number of operating conditions of the TRU, such as the box temperature, ambient temperature, and operating parameters of the TRU 15, such as evaporator temperature, pressures, etc. in order to allow the unit controller 35 to draw a conclusion on what action has to be taken to achieve a desired state within the interior space 50. For example, the unit controller 35 may compare the current state (e.g. box temperature and ambient temperature) with a target state (e.g. a set temperature for the box) and regulate the current cooling capacity of the TRU 15 accordingly. This may be done by sending control signaling to various control devices of the TRU 15, such as refrigeration throttling valves, dampers etc., which control the movement of the refrigerant through the refrigeration circuit.

The TRS 10 further includes a power bay (not shown), which houses a prime mover in the form of an internal combustion engine 60 (e.g., diesel engine, etc.) that provides power to operate the TRU 15, particularly the compressor 90. The power bay may also or instead house an onboard electric motor and corresponding prime mover which can provide power to operate the TRU 15 when the combustion engine is inactive, e.g. when the transport unit is parked, at a warehouse or on a ferry for example.

The unit controller 35 itself is powered by a power module (not shown), which can include a DC power source (e.g. a battery) for providing DC electrical power to the plurality of DC components (not shown) etc. The DC power source can receive mechanical and/or electrical power from, for example, the prime mover of the power bay when coupled with a generator machine (e.g., a belt-driven alternator, a direct drive generator, etc.), etc. For example, in some embodiments, mechanical energy generated by a diesel engine is converted into electrical energy via a generator machine. The electrical energy generated via, e.g. a belt driven generator, is then converted into DC electrical power via, for example, a bi-directional voltage converter. The bi-directional voltage converter can be a bi-directional multi-battery voltage converter.

The power module is disposed either in the TRU 15 or separately from the TRU 15. The power module can provide power to, for example, a plurality of DC (Direct Current) components (not shown), a power management unit, etc. The DC components can be accessories or components of the unit controller that require DC power to operate. Examples of the DC components can include, for example, a fuel pump, a drain tube heater, solenoid valves (e.g., controller pulsed control valves), etc.

The engine 60 is an electronically governed, power limited internal engine in that the speed and thus power output of the engine 60 is controlled by an engine control unit 65 via at least one electrically actuated solenoid valve 62, although other electrically actuated valves may be used instead. The position of the solenoid valve may be set so as to regulate the amount of fuel reaching the combustion chamber, based on a control signal received from the engine control unit 65. During operation, the unit controller 35 may, for example, set a nominal engine speed at which to drive the compressor 90 and communicate that to an engine control unit 65. The engine control unit 65 is, for example, a proportional-integral-derivative controller (PID controller) that provides speed control by continuously calculating an error value as the difference between the nominal engine speed and a current, measured engine speed and applies a speed correction based on proportional, integral and derivative terms, as is known in the art.

The engine control unit is operable to control the speed of the engine 60 in an isochronous mode of operation, wherein the engine control unit 65 maintains a constant engine speed for varying engine loads.

Figure 3:
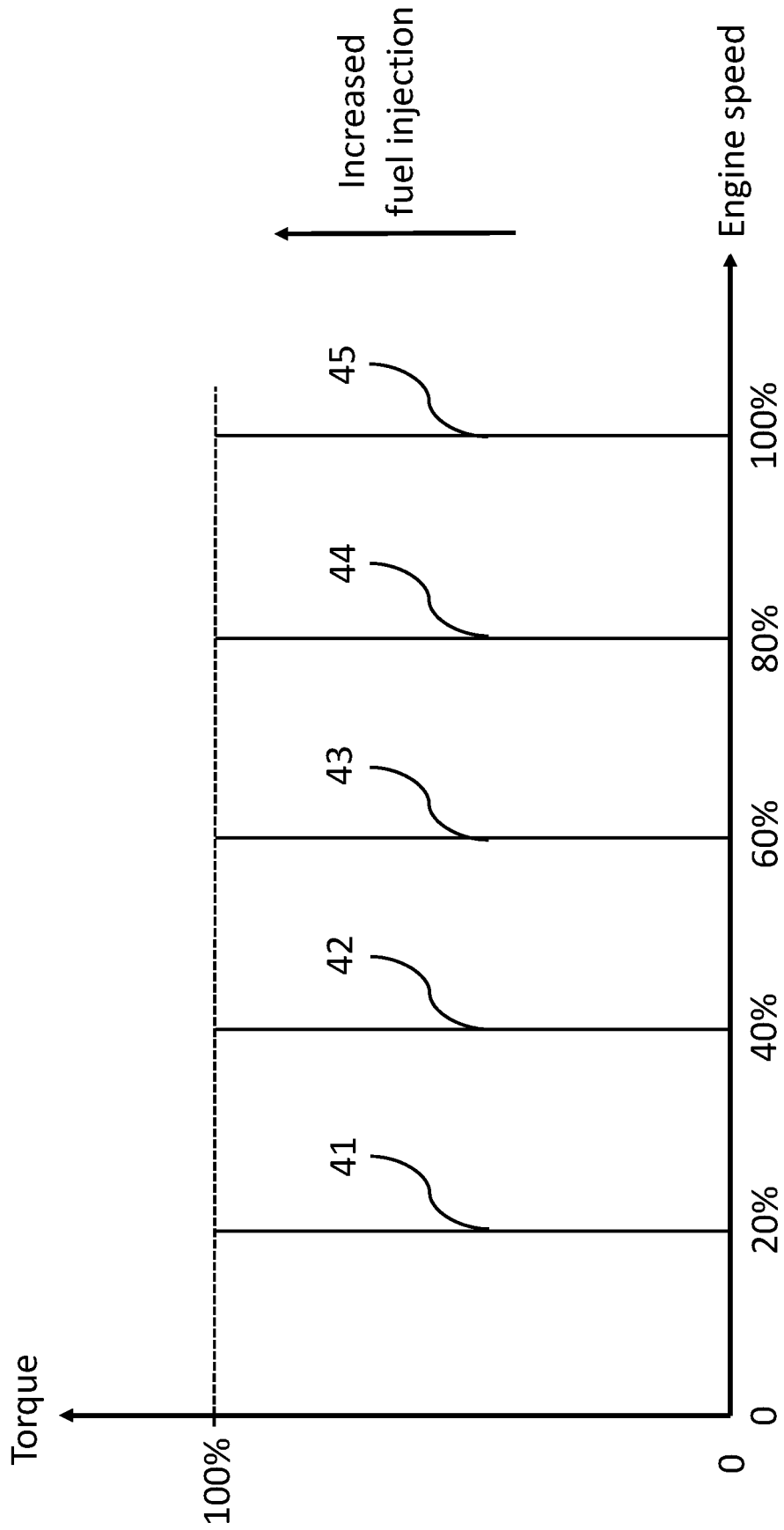
FIG. 3 is a schematic illustration of a plurality of torque-speed profiles of an electronically governed engine operating in an isochronous mode of operation, in accordance with an embodiment.

FIG. 3 schematically illustrates a set of torque and engine speed profiles of the electronically governed engine 60 operating in an isochronous mode of operation, in accordance with an embodiment of the technology described herein.

The engine control unit 65 may be pre-configured with appropriate software, e.g. at manufacture, to control the position of the solenoid valve 62 between a fully open position and a fully closed position, and thus the flow of fuel to the engine, to ensure that the engine speed remains constant for different loads (referred to synonymously as torques) on the engine. In this regard, and as shown in FIG. 3, the engine control unit 65 is configured to operate the engine 60 according to one of a set of plural predefined torque-speed profiles 41-45, which are stored in non-volatile memory for reference by the engine control unit 65. Although only five such profiles are shown in FIG. 3, it will be appreciated that the engine control unit 65 may store (and correspondingly operate the engine according to) any number of such profiles.

The engine 60 is configured to operate at a constant speed (between 0% and 100% of the rated speed of the engine) for the entire range of loads (0-100% of the rated load or torque) that the engine is manufactured to withstand. The torque-speed profile that is used to operate the engine in isochronous mode of operation is selected by the engine control unit 65 based on a nominal speed instruction received by the unit controller 35 of the TRU 15.

When the engine control unit 65 operates the engine 60 according to one of the predefined isochronous torque-speed profiles, e.g. profile 43 of FIG. 3, the (position of the) solenoid valve 62 will be increasingly opened or closed by the engine control unit 65 as the load on the engine 60 varies, to provide the rate of fuel injection required to maintain a constant engine speed (at 60% of the rated speed of the engine, in this example). In particular, when the load on the engine increases, the solenoid valve is moved to a position that increases the mass flow rate of fuel to the engine. Conversely, when the load on the engine decreases, the solenoid valve is moved to a position that decreases the mass flow rate of fuel to the engine.

For any fixed engine speed, the power output of the engine will be at its minimum when the engine load is at 0% torque (or as close to 0% torque as possible, in practice) and will be at its maximum when the engine load is at 100% torque. The engine control unit 65 therefore limits the maximum speed of the engine to its rated speed (100% speed), i.e. the speed at which the power output of the engine will be at its maximum when operating at full load (100% torque), for all load variations (as illustrated by torque-speed profile 45 of FIG. 3) to ensure that the power output of the engine does not exceed the limit set by emission regulations.

When the engine control unit 65 is operating the engine 60 in isochronous mode of operation (e.g. at its rated speed at profile 45 of FIG. 3), the power output of the engine 60 will be below its maximum, power limited value if the load on the engine from the refrigeration circuit 80 is less than full load. In such low load conditions, the engine will have an excess power generating capacity, which the Applicant has recognised may be used advantageously by the TRU 15 to increase its cooling capacity beyond what would otherwise be possible at those loads. For example, the excess capacity could be used to drive the engine at speeds that are higher than its rated speed, thereby increasing the rate at which the compressor can pump refrigerant about the refrigeration cycle. This is achieved, according to the technology described herein, by configuring the engine control unit 35 to be able to operate the engine in not only an isochronous mode of operation, as described above, but also a droop mode of operation in which the engine speed is allowed to vary with different engine loads, as will now be described further with respect to FIG. 4.

Figure 4:
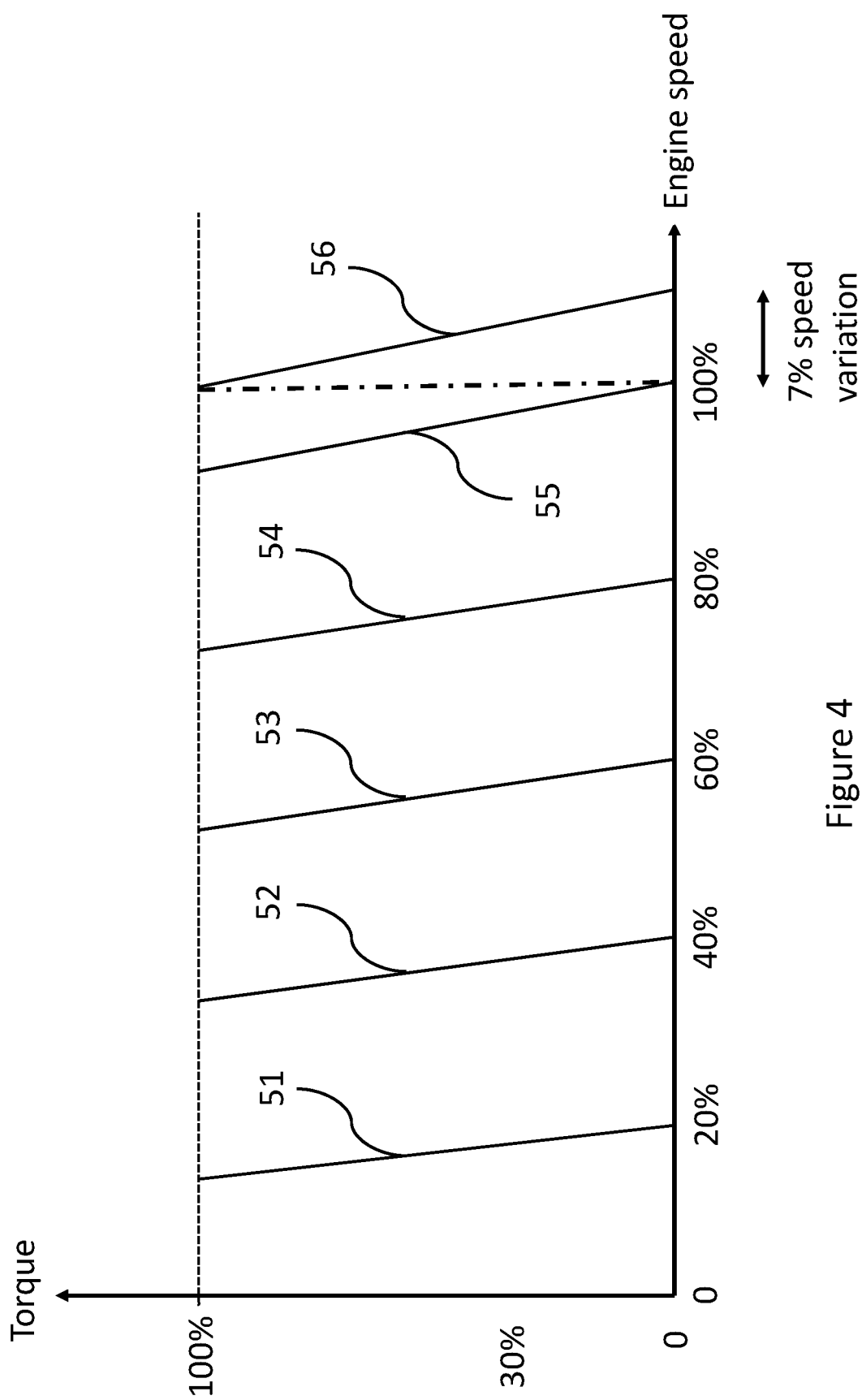
FIG. 4 is a schematic illustration of a plurality of torque-speed profiles of an electronically governed engine operating in a droop mode of operation, in accordance with an embodiment.

FIG. 4 schematically illustrates a set of torque and engine speed profiles of an electronically governed engine operating in a droop mode of operation, in accordance with an embodiment of the technology described herein.

Similarly to the case of isochronous mode of operation, the engine control unit 65 may be pre-configured with appropriate software, e.g. at manufacture, to operate the engine 60 according to one of a plurality of predefined torque-speed profiles 51-56, which may be stored in non-volatile memory for use by the engine control unit 65. In particular, the unit controller 35 of the TRU 15 may set a nominal engine speed for the TRU 15, and transmit that to the engine control unit 65 which will in turn select an appropriate torque-speed profile to follow. Six such profiles are shown in FIG. 4, but it will be appreciated that any number of profiles may be predefined and stored in memory for use by the engine control unit 65.

In contrast to the isochronous mode of operation described above with respect to FIG. 4, in the droop mode of operation the torque-speed profiles allow for the speed of the engine 60 to vary in line with the engine load. For example, as shown by profile 56 of FIG. 4, the engine speed is set at a first, predefined speed (100% speed) corresponding to its rated speed in this example, for arrangements where the engine is at full load (100% torque), but is allowed to increase beyond the first speed as the load on the engine decreases from full load. In this way, the engine may be operated at speeds that are above its rated speed when not at full load, which as described above may be advantageous for maximising the cooling capacity of the TRU 15.

In practice, the engine control unit 65 is pre-programmed to continuously monitor the load on the engine 60 (e.g. using a conventional sensor(s) known in the art) and automatically set the solenoid valve to a position that corresponds to the speed indicated by the torque-speed profile. The extent by which the speed of the engine is allowed to change for a given change in engine load can be predefined and set to ensure that the engine power output remains at or below the maximum power output set by emission standards. In an embodiment, the engine speed is allowed to vary with engine load by up to 7% of the first speed, or rated speed in this example.

It will be appreciated that although the droop mode of operation has been described above only with respect to increasing the engine speed above the rated speed of the engine, the droop mode of operation can be (and in embodiments is) used more widely to maximise engine speed (by utilising excess power capacity of the engine at lower loads) wherever possible, even if that does not result in speeds above the rated speed.

Furthermore, it will be appreciated that although the droop mode of operation has been described above as being provided in combination with the functionality of the isochronous mode of operation, this dual functionality is not essential. Instead, according to embodiments the technology described herein, the engine may be operable by the engine control unit in droop mode only.

As mentioned above, by operating the electronically governed engine in a droop mode of operation, the excess power capacity of the engine at low-load conditions can be used advantageously to maximise the cooling capacity of the TRU 15. This may be the case, for example, in circumstances where the TRU 15 operates in a so-called "pull-down mode" which, as is known in the art, is a mode where the unit controller 35 operates the TRU 15 to reduce the box temperature to a set temperature as quickly as possible. However, the TRU 15 will benefit from the increased cooling capacity when operating in droop mode of operation whenever the TRU requires high speed cooling. For example, droop mode of operation may be utilised when attempting to maximize cooling capacity during a so-called "ATP test", which is a known test designed to certify the cooling capacity of a TRU as suitable for the International Carriage of Perishable Foodstuffs.

Although automatically increasing the engine speed (and thus cooling capacity) for engine loads that are below the full load of the engine may be suitable when attempting to maximize cooling capacity, it may be unsuitable in other circumstances, such as when the TRU operates in a so-called "continuous cool modulation" mode, which is known in the art to be a mode of operation in which the unit controller 35 continuously modulates the current cooling capacity of the TRU to maintain a constant box temperature, e.g. in response to ambient temperature fluctuations.

In that regard, where the cooling load required to maintain a set temperature within the box decreases, e.g. due to a decrease in ambient temperature, the unit controller 35 of the TRU 15 will modify the position of a throttling valve of the refrigeration circuit 80 to throttle the flow of refrigerant to be pumped by the compressor 90, in an attempt to reduce the current cooling capacity of the TRU 15 to match the new cooling load. However, in droop mode, the resulting decrease of engine load will cause the engine speed and thus cooling capacity to increase beyond what is necessary to maintain the set temperature, such that the engine 60 will be working against the intention of the unit controller 35 of the TRU 15. Consequently, a controller of the TRU will have to throttle the refrigerant flow even further to prevent excessive cooling of the interior space. This is clearly an inefficient use of engine fuel.

In those circumstances, it is possible to instead operate the engine in the isochronous mode of operation, so that a reduction in engine load as a result of throttling of refrigerant will be met by a reduction of fuel flow to the engine (to maintain a constant speed). This will obviate the need for excessive throttling of refrigerant flow to meet the cooling demands of the internal space, while providing increased fuel economy.

In order to ensure that the most beneficial mode of operation of operation can be used at any given time when operating the TRS, the engine control unit may be configured to alternately change between the droop mode of operation and the isochronous mode of operation of the engine 60.

In one embodiment, as shown in the TRS 10 of FIG. 2, the TRU 15 comprises a user-operable switch 70 that allows a user to select either mode of operation as the current mode to be used for the system 10. Accordingly, the switch may be operable between a first state, at which the engine control unit 65 will operate the engine 60 in a droop mode of operation only, and a second state, at which the engine control unit 65 will operate the engine 60 in an isochronous mode of operation only.

The switch 70 may be provided as part of the TRU 15, and may be in communication with the unit controller 35 thereof. The switch 70 may be a mechanical switch or an electronic switch, e.g. a switch that is in the form of user-selectable option on a machine-user interface provided as part of the system 10. In either case, the unit controller 35 will communicate to the engine control unit 65 the current state of the switch, and accordingly the mode of operation to be used by the engine control unit 65 to control the engine speed.

Instead of responding to a switch, however, the engine control unit 65 may instead be configured to automatically change between the droop and isochronous modes of operation, based on control signalling received from the unit controller 35, for example.

Figure 5:
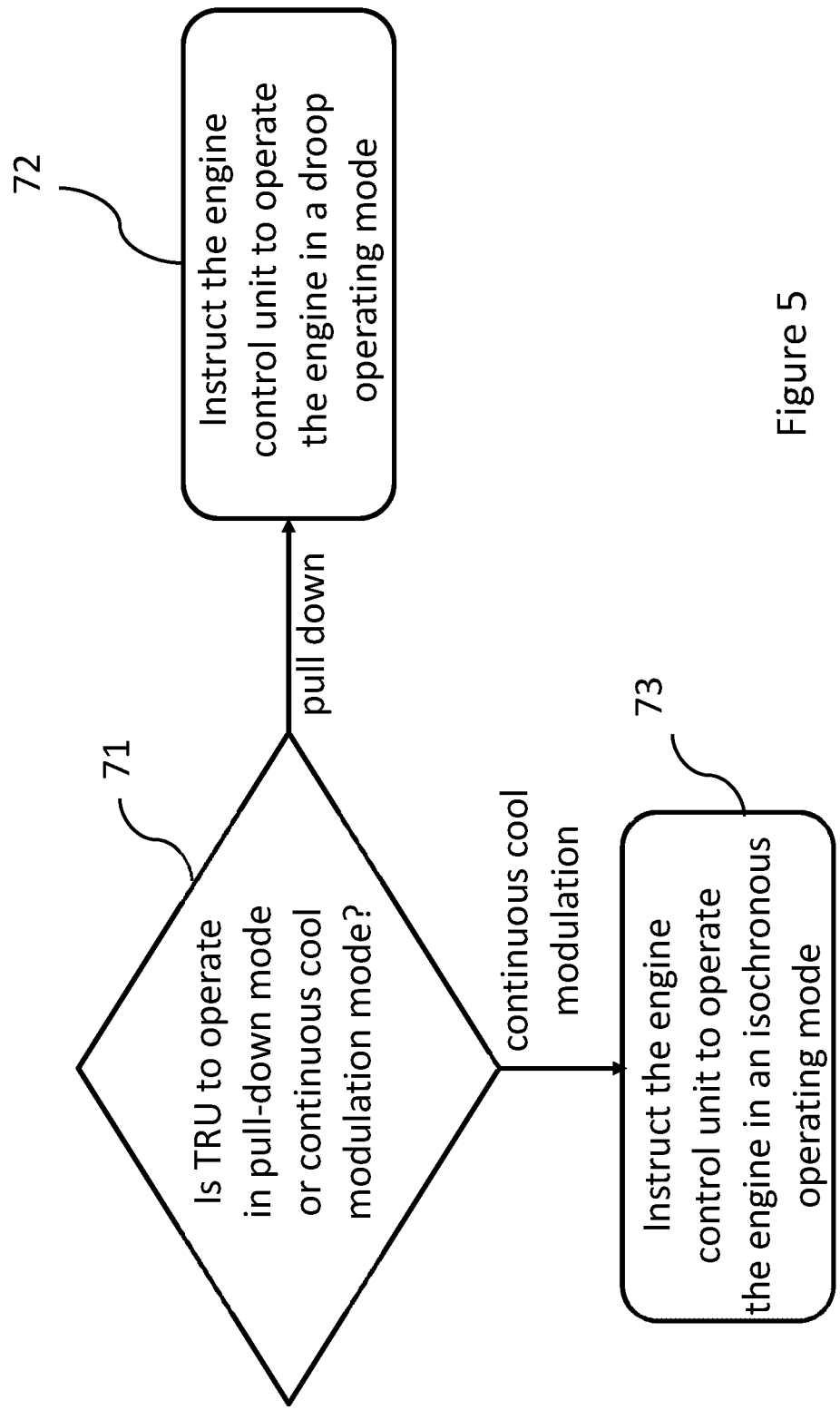
FIG. 5 is a flow diagram schematically illustrating the control logic of, and the processing steps to be taken by, a unit controller, in accordance with an embodiment.

FIG. 5 is a flow diagram schematically illustrating the control logic and processing steps that the unit controller 35 is programmed to execute according to such an embodiment.

At step 71 of FIG. 5, the process begins when the unit controller 35 determines the operating mode at which it is necessary or desired to operate the TRU 15 to obtain a set temperature. In particular, the unit controller 35 will determine, based on a number of current operating conditions of the TRU 15, such as the box temperature and ambient temperature etc., whether it is necessary for the TRU 15 to operate in a pull-down mode or a continuous cool mode of operation to achieve a desired state within the interior space.

If it is determined at step 71 that the TRU 15 is to be operated in a pull-down mode of operation, the unit controller 35 will proceed to step 72 and instruct the engine control unit 65 to operate the engine 60 in the droop mode of operation to maximise cooling capacity for the entire pull-down operation. If, on the other hand, it is determined at step 71 that the TRU 15 is to be operated in a continuous cool modulation mode of operation, the unit controller 35 will proceed to step 72 and instruct the engine control unit 65 to operate the engine in the isochronous mode of operation to maximise fuel economy for the entire continuous cool modulation operation.

In this way, the unit controller 35 will ensure that the TRU 15 receives the most beneficial engine speed for the current operating mode of the TRS 10.

Although the droop operating mode of the engine may be set at the beginning of a pull-down operation of the TRU 15, it may be the case in some arrangements for the engine to be operated in the droop operating mode only after the load on the engine has decreased below a threshold value. For example, it may be beneficial to operate the engine in the isochronous mode of operation, which is more fuel efficient, until the engine load decreases to a level at which the speed of the engine can, if operating in a droop mode of operation, be increased to a sufficiently high level that the benefit of increased cooling capacity would outweigh the increased level of fuel consumption that is associated with droop mode.

Figure 6:
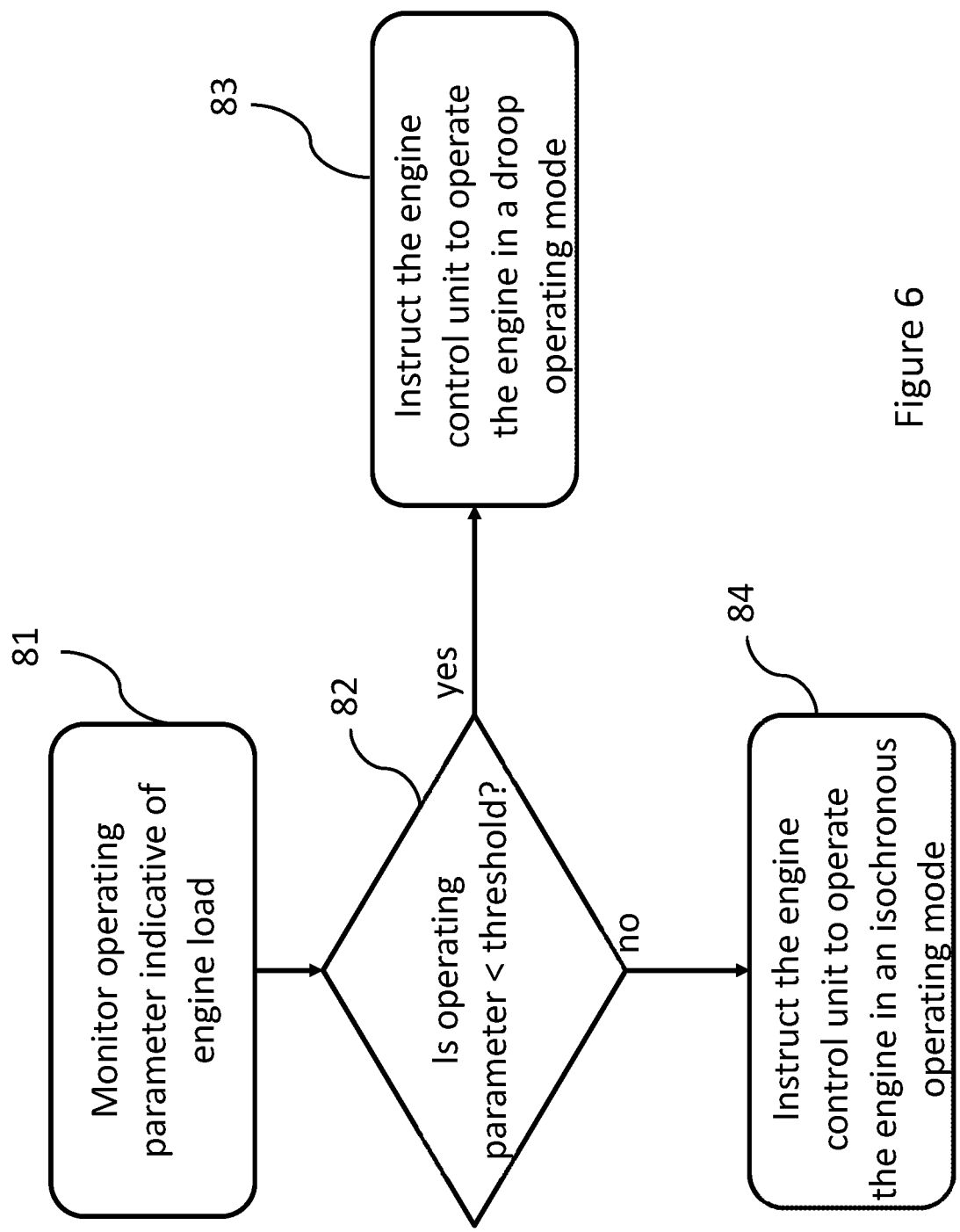
FIG. 6 is a flow diagram schematically illustrating control the logic of, and the processing steps to be taken by, a unit controller, in accordance with another embodiment.

FIG. 6 is a flow diagram schematically illustrating control logic and processing steps that the unit controller 35 is programmed to execute when the TRU is to perform a pull-down operation, in accordance with an embodiment of the technology described herein.

The unit controller 35 of the TRU 15 begins at step 81 by continuously monitoring the current value of an operating parameter which is indicative (directly or indirectly) of the load applied to the engine 60 by the refrigeration circuit 80. Any suitable operating parameter which is indicative of the engine load can be used.

In that regard, the Applicant has recognised that the load on the engine decreases as the evaporator temperature of the TRU 15, i.e. the temperature of the refrigerant within the evaporator, decreases. For example, the engine load is lower when the evaporator temperature is below freezing (e.g. at −20° C.) than it is when the evaporator temperature is merely cold (e.g. 0-5° C.). Accordingly, the evaporator temperature may be monitored (with a temperature sensor) at step 81. In other arrangements, however, the box (interior space) temperature may be monitored instead of the evaporator temperature, as the box temperature correlates closely with the evaporator temperature and thus the load on the engine.

Alternatively, the operating parameter that is monitored at step 81 may be a direct measurement of the engine load itself. As mentioned above, the engine control unit may already be configured to monitor the load on the engine 60, and in that case the current engine load may be communicated to the unit controller 35 at step 81.

At step 82, the unit controller compares the current operating parameter to a predefined threshold value for the operating parameter in question and selects whether to use the droop mode of operation or the isochronous mode of operation based on that comparison.

Where the monitored operating parameter is an evaporator temperature or box temperature, the operating parameter value at which to set the threshold will vary for different transport refrigeration systems, e.g. based on the size of the TRU (in terms of its maximum cooling capacity), the power threshold limit of the engine etc. Therefore, the threshold value to use for the comparison at step 82 may be predetermined on a system-by-system basis, using suitable methods of experimentation or analysis. For example, one could conduct an analysis for their specific system and determine to what extent the engine load varies with different evaporator or box temperatures, and determine a value at which to set the threshold.

Where the monitored operating parameter is the engine load itself, however, the threshold value will be pre-set at a value that is less than the full load of the engine. In embodiments, the threshold load value may be 80%, 60% or 40% of the full load of the engine.

If it is determined at step 82 that the monitored operating parameter is less than the predefined threshold value, then the unit controller 35 will proceed to step 83, at which point it sends appropriate control signalling to instruct the engine control unit 65 to operate the engine in the droop mode of operation. If, however, it is determined at step 82 that the operating parameter is greater than the predefined threshold value, then the unit controller 35 will proceed to step 84, at which point it sends appropriate control signalling to instruct the engine control unit 65 to operate the engine in the isochronous mode of operation.

It will be appreciated that, although the processing steps of FIG. 6 have been described as being performed during a pull-down operation, the embodiment of FIG. 6 is applicable to any arrangement where it is desired for the cooling capacity to be maximised.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. That is, the technology described herein is not limited to the embodiments above-described and except where mutually exclusive, any of the features may be employed separately or in combination with any other features and the disclosure extends to and includes all combinations and sub-combinations of one or more features described herein.

The word "embodiment" as used within this specification may, but does not necessarily, refer to the same embodiment. This specification and the embodiments described are examples only. Other and further embodiments may be devised without departing from the basic scope thereof, with the true scope of the disclosure being indicated by the claims that follow.

The invention claimed is:

1. A transport refrigeration system comprising:
an electronically governed engine;
a transport refrigeration unit including a refrigeration circuit that comprises a compressor, which is configured to be driven by the engine to pump refrigerant about the refrigeration circuit, and a controller which is configured to set a nominal engine speed at which to drive the compressor and communicate that to an engine control unit of the system; and
a user-operable switch which causes the engine control unit to operate the engine in a droop mode of operation when the switch is set to a first state, and which causes the engine control unit to operate the engine in an isochronous mode of operation when the switch is set to a second, different state to the first state
wherein the engine control unit is configured to operate the engine in the droop mode of operation, in which:
the engine control unit operates the engine according to a predefined torque-speed profile corresponding to the nominal engine speed; and
the torque-speed profile indicates different engine speeds at which to drive the compressor for respective non-zero engine loads, wherein the torque-speed profile indicates the nominal engine speed at full engine load and one or more engine speeds that are above the nominal engine speed at engine loads below the full engine load, such that the engine speed will increase above the nominal engine speed as the engine load from the refrigeration circuit decreases from the full engine load,
wherein the engine control unit is configured to alternately operate the engine in the droop mode of operation and the isochronous mode of operation, in which the engine control unit operates the engine according to an isochronous torque-speed profile to maintain the engine at a fixed engine speed for varying engine loads.

2. The transport refrigeration system according to claim 1, wherein:
the engine control unit, or the controller of the transport refrigeration unit, is configured to monitor an operating parameter that is indicative of the engine load; and
the engine control unit is configured to automatically alternate between the droop mode of operation and the isochronous mode of operation based on the operating parameter.

3. The transport refrigeration system according to claim 2, wherein the engine control unit is configured to operate the engine in:
the droop mode of operation, if the monitored operating parameter is at or below a predetermined threshold value for the operating parameter; and
the isochronous mode of operation, if the operating parameter is greater than the predetermined threshold value.

4. The transport refrigeration system according to claim 3, wherein the operating parameter is:
a box temperature of the transport refrigeration unit; or
a load acting on the prime mover of the engine.

5. The transport refrigeration system according to claim 1, wherein the engine control unit is configured to operate the engine in the droop mode of operation when the nominal engine speed is set to a rated speed of the engine, such that the engine speed will increase above the rated speed at engine loads below a rated load of the engine.

6. The transport refrigeration system according to claim 1, wherein the engine control unit is configured to operate the engine in an isochronous mode of operation, in which the engine speed is maintained at a fixed speed for varying engine loads, when the transport refrigeration unit operates in a continuous cool modulation mode.

7. The transport refrigeration system according to claim 1, wherein the engine control unit is configured to operate the engine in the droop mode of operation when the transport refrigeration unit operates in a pull-down mode of operation.

8. A method of operating a transport refrigeration system that includes an electronically governed engine and a transport refrigeration unit which includes a refrigeration circuit, the method comprising:
powering the electronically governed engine to drive a compressor of the refrigeration circuit to pump refrigerant about the refrigeration circuit;
a controller setting a nominal engine speed at which to drive the compressor and communicating that to an engine control unit of the system;
the engine control unit operating the engine in a droop mode of operation, comprising:

the engine control unit operating the engine according to a predefined torque-speed profile corresponding to the nominal engine speed;

wherein the torque-speed profile indicates different engine speeds to be used for respective non-zero engine loads, wherein the torque-speed profile indicates the nominal engine speed at full engine load and one or more engine speeds that are above the nominal engine speed at engine loads below the full engine load, such that the engine speed will increase above the nominal engine speed as the engine load from the refrigeration circuit decreases from the full engine load;

the engine control unit alternately operating the engine in the droop mode of operation and an isochronous mode of operation, in which the engine control unit operates the engine according to an isochronous torque-speed profile to maintain a fixed engine speed for varying engine loads; and a user operating a switch to cause the engine control unit to operate the engine in either the isochronous mode of operation or the droop mode of operation.

9. The method according to claim 8, further comprising:
monitoring, using the engine control unit or the controller of the transport refrigeration unit, an operating parameter that is indicative of the engine load; and
the engine control unit automatically alternating between the droop mode of operation and the isochronous mode of operation based on the operating parameter.

10. The method according to claim 9, further comprising the engine control unit:
operating the engine in the droop mode of operation, if the operating parameter is at or below a predetermined threshold value; and
operating the engine in the isochronous mode of operation, if the operating parameter is greater than the predetermined threshold value.

11. The method according to claim 9, wherein the operating parameter is a box temperature of the transport refrigeration unit.

12. The method according to claim 9, wherein the operating parameter is a load acting on the prime mover of the engine.

13. The method according to claim 8, further comprising the engine control unit operating the engine in the droop mode of operation when the nominal engine speed is set to a rated speed of the engine, such that the engine speed will increase above the rated speed at engine loads below a rated load of the engine.

14. The method according to claim 8, further comprising the engine control unit operating the engine in the isochronous mode of operation, in which the engine speed is maintained at a fixed speed for varying engine loads, when the transport refrigeration unit operates in a continuous cool modulation mode.

15. The method according to claim 8, further comprising the engine control unit operating the engine in the droop mode of operation when the transport refrigeration unit operates in a pull-down mode of operation.

16. A transport refrigeration system comprising:
an electronically governed engine; and
a transport refrigeration unit including a refrigeration circuit that comprises a compressor, which is configured to be driven by the engine to pump refrigerant about the refrigeration circuit, and a controller which is configured to set a nominal engine speed at which to drive the compressor and communicate that to an engine control unit of the system;

wherein the engine control unit is configured to operate the engine in a droop mode of operation, in which:
the engine control unit operates the engine according to a predefined torque-speed profile corresponding to the nominal engine speed; and
the torque-speed profile indicates different engine speeds at which to drive the compressor for respective non-zero engine loads, wherein the torque-speed profile indicates the nominal engine speed at full engine load and one or more engine speeds that are above the nominal engine speed at engine loads below the full engine load, such that the engine speed will increase above the nominal engine speed as the engine load from the refrigeration circuit decreases from the full engine load, wherein the engine control unit is configured to alternately operate the engine in the droop mode of operation and an isochronous mode of operation, in which the engine control unit operates the engine according to an isochronous torque-speed profile to maintain the engine at a fixed engine speed for varying engine loads, wherein:
the engine control unit, or the controller of the transport refrigeration unit, is configured to monitor an operating parameter that is indicative of the engine load; and
the engine control unit is configured to automatically alternate between the droop mode of operation and the isochronous mode of operation based on the operating parameter, and wherein the engine control unit is configured to operate the engine in:
the droop mode of operation, if the monitored operating parameter is at or below a predetermined threshold value for the operating parameter; and
the isochronous mode of operation, if the operating parameter is greater than the predetermined threshold value.

17. A method of operating a transport refrigeration system that includes an electronically governed engine and a transport refrigeration unit which includes a refrigeration circuit, the method comprising:
powering the electronically governed engine to drive a compressor of the refrigeration circuit to pump refrigerant about the refrigeration circuit;
a controller setting a nominal engine speed at which to drive the compressor and communicating that to an engine control unit of the system;
the engine control unit operating the engine in a droop mode of operation, comprising:
the engine control unit operating the engine according to a predefined torque-speed profile corresponding to the nominal engine speed;
wherein the torque-speed profile indicates different engine speeds to be used for respective non-zero engine loads, wherein the torque-speed profile indicates the nominal engine speed at full engine load and one or more engine speeds that are above the nominal engine speed at engine loads below the full engine load, such that the engine speed will increase above the nominal engine speed as the engine load from the refrigeration circuit decreases from the full engine load;
the engine control unit alternately operating the engine in the droop mode of operation and an isochronous mode of operation, in which the engine control unit operates the engine according to an isochronous torque-speed profile to maintain a fixed engine speed for varying engine loads;

monitoring, using the engine control unit or the controller of the transport refrigeration unit, an operating parameter that is indicative of the engine load;

the engine control unit automatically alternating between the droop mode of operation and the isochronous mode of operation based on the operating parameter, wherein the operating parameter is a box temperature of the transport refrigeration unit.

\* \* \* \* \*